United States Patent Office 2,774,091
Patented Dec. 18, 1956

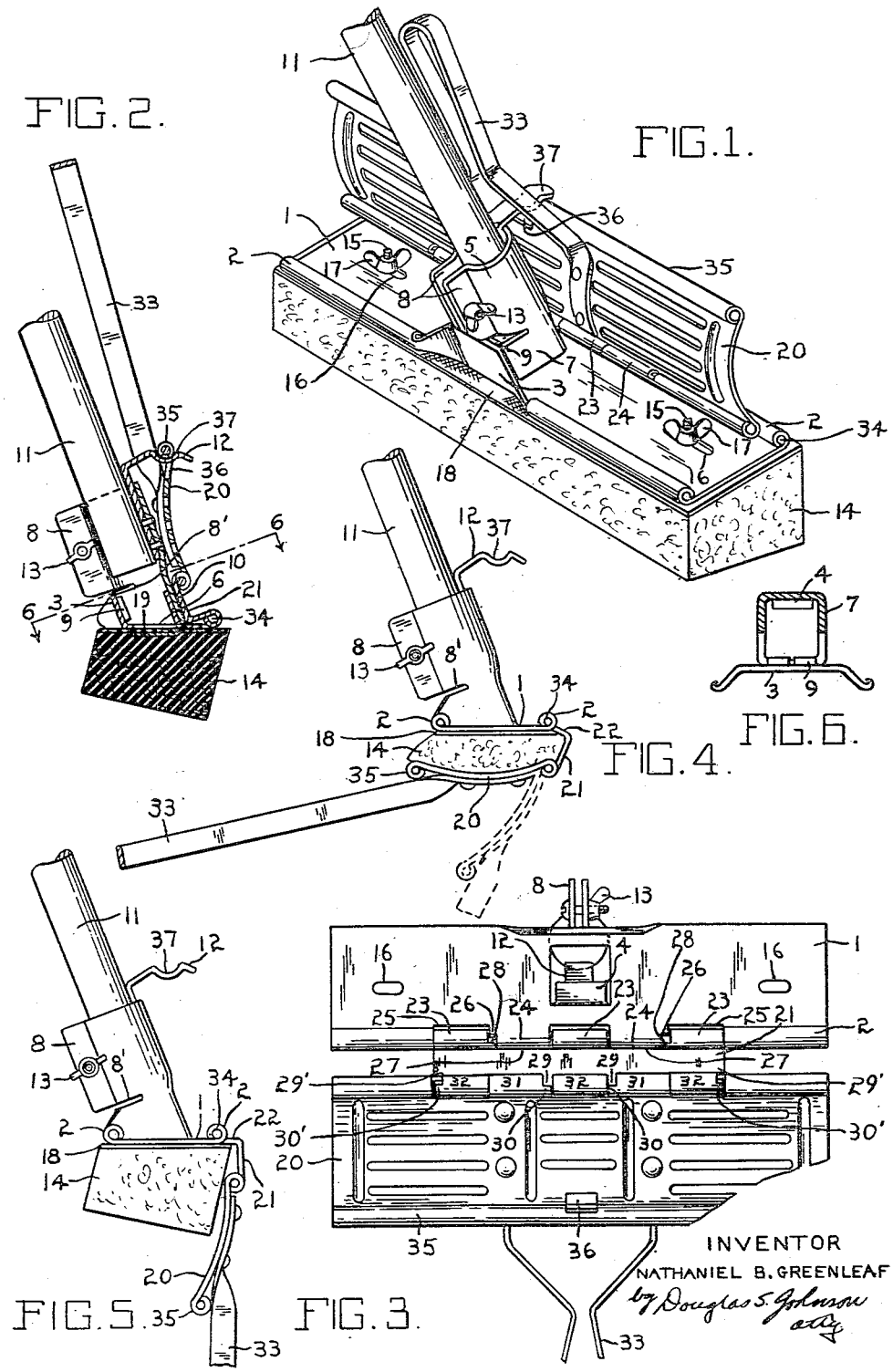

2,774,091

WRINGER TYPE MOP

Nathaniel B. Greenleaf, Toronto, Ontario, Canada

Application July 31, 1951, Serial No. 239,449

7 Claims. (Cl. 15—119)

This invention relates to cleaning devices such as sponge mops and the like and particularly to sponge mops provided with wringer attachments.

The principal object of the invention is to provide an improved simplified and stronger socket connection for securing the handle to the head of the device. More particularly it is an object to enable the socket connection to the head of a wringer mop to withstand the strain of wringing without detriment to the connection and without deformation of the socket.

A further object is to ensure that the socket is accurately located on the head on assembly.

A further object is to provide an improved simplified wringing action in a sponge wringer mop which will preclude undesired distortion of the sponge and stresses tending to pull the sponge from its backing.

In the construction of cleaning devices embodying a handle and a head it is frequently the practice to provide a simple split socket formed at the bottom with lateral wings which are welded or riveted to the head. This construction, while relatively inexpensive, has certain disadvantages in that the socket and head need be accurately oriented on assembly and the socket must be formed by a progressive die due to the lateral flare of the wings, and its shape and split construction has no great inherent structural strength.

Moreover, when employed in a wringer mop the connection between the socket and head is placed in tension under wringing stresses. Particularly when welded this connection is inherently weak under tensional stresses and under any imperfection of the weld or under excessive or violent wringing a failure at the connection is likely to occur.

The principal feature of this invention resides in forming the head to which the socket is to be attached with integral upstanding lug extensions aligned with the desired socket inclination and rigidly securing the socket formed with the wings eliminated to the lug extensions to place the connection between the socket and head in shear under any stress tending to separate the head and socket.

With this arrangement the construction of the socket is greatly simplified and may be formed as a simple split socket by a simple closing die, and the connection affords a means of providing complete rigidity and high strength to the socket and offers maximum strength particularly to withstand wringing stress.

Another important feature resides in forming the base of the socket of rectilinear form having an inherent structural strength and presenting an edge perpendicular to the head to eliminate bending stresses on the socket and forming the upstanding lug extensions to coact with the socket base form to accurately guide and locate the socket in correct orientation upon assembly.

A further feature resides in turning at least one of the lug extensions up from the metal underlying the socket to provide ventilation through the head beneath the socket.

A further feature resides in forming the cleaning device as a sponge mop and hinging a wringer to the head by means of a right angled hinge link, the wringer movement in engaging and compressing the sponge, placing the socket connection in shear while restricting displacement of the sponge adjacent its backing to preclude stressing the sponge at this point to pull it from its backing.

These and other objects and features will become apparent with reference to the following description taken in conjunction with the accompanying drawings in which Figure 1 is a perspective view taken from the rear of a mop embodying the invention.

Figure 2 is a mid-vertical sectional view of the mop of Figure 1.

Figure 3 is an underside plan view with the sponge removed and the wringer plate swung into alignment with the mop head.

Figure 4 is a side elevational view showing the wringer plate swung to wringer position.

Figure 5 is a side elevational view showing the approximate stop position of the right angle hinge link connecting the wringer to the mop with the wringer in position to swing to compress the sponge material.

Figure 6 is a plan sectional view of the lower portion of the socket taken along line 6—6 of Figure 2 showing the details of the rectilinear form of the socket base and its attachment.

With reference to the drawings, the mop head 1 comprises an elongated plate having rolled longitudinal edges 2. The rearward edge is formed up intermediate its length to provide a lug extension 3, and the material of the plate at a central portion opposite lug 3 is turned up at 4 to define a lug extension extending parallel to the lug 3, and at an inclination to the head 1 corresponding to the desired inclination of the socket 5.

The turned up lug or tongue 4 is provided by slotting the head 1 to define the opening 6 which is adapted to align with and form a ventilating opening at the base 7 of the socket 5. The socket is formed by bending a stamping to generally tubular shape to constitute a split socket having the spaced rearwardly extending flange portions or wings 8, at the bottom of which are the slots 8'. The base 7 is shaped into generally rectilinear form to present at the rear below the flanges 8 the flat inward co-planar portions 9 whose edges are in contiguous relation but not necessarily abutting, the flat portions 9 abutting the lug extension 3 and to present at the front the flattened surface formation 10 abutting the lug or tongue 4.

The lugs 3 and 4 and socket surface formations 9 and 10 present surfaces having appreciable contact areas and these surfaces are preferably welded together to secure the socket to the head.

Additionally, it will be appreciated that the lugs coact with the socket to form a guide enabling the socket to be quickly and accurately located on the head in correct orientation.

In the illustration, the lugs 3 and 4 form a guide formation engaging the front and rear of the socket 5 and a similar set of lug extensions may be stamped up from the head 1 to engage the side walls of the socket base if desired. The pattern and number of these lugs will be determined by the particular socket shape to be assembled and the particular strength of the connection between the socket and head desired.

The upper portion of the socket is enlarged to receive a handle 11 and a cantilever spring 12 which is rivetted to the front thereof. A clamping screw and wing nut 13 engaging through the flange portions 8 enables the handle 11 to be releasably clamped in position with slots 8' permitting the socket to grip the handle from the top through to the base 7.

Secured to the underside of the head 1 is a sponge refill 14 in the form of a sponge block having upwardly extending threaded lugs 15 engaging through openings 16 and receiving the clamping wing nuts 17.

The sponge block 14 is preferably tapered towards the rear as illustrated and has an overlying fabric 18 which facilitates the securement of the plate 19 carrying the threaded lugs 15 to the sponge material.

The wringer 20 is pivotally connected to the forward edge of the head 1 by means of the hinge link 21. This link is of right angled form having a hinge connecting section 22 at right angles thereto, and this hinge connecting section is formed of a plurality of rolled hinge barrels 23 adapted to interleave with corresponding hinge barrels 24 formed at the forward rolled edge of the mop head 1.

As shown in Figure 3, each of the slots 25, into which the barrels 23 at the ends of the hinge link enter, is provided with a notch 26, while the corresponding slots 27, into which the hinge barrels 24 extend, have corresponding notches 28 adapted to engage the notches 26 when the hinge link reaches the position of Figure 4 to form a stop preventing link movement beyond this point under wringing action.

A corresponding set of stop notches 29 and 30 are formed on the link and wringer 20 respectively adapted to engage with the link and wringer hinge barrels 31 and 32 interleaved to provide a hinge connection therebetween. The notches 29 and 30 are arranged to provide a stop to limit movement of the wringer 20 when swung in an anti-clockwise direction as viewed from Figure 4 into substantial alignment with the body of the link 21, as shown in Figure 5 and as illustrated in Figure 2. Notches 29' and 30' prevent wringer movement beyond Figure 4.

With the hinge connection described and illustrated the flushing action is effective and the hinge connections between the head and link and between the link and wringer, particularly the latter, are relatively stiff so that when the wringer is swung by its handle 33 the whole assembly swings about the pivot 34 of the hinge between the link and head to the position of Figure 5. The wringer is then in position to swing into engagement with the sponge to exert a compressive action, and when swung through to the position of Figure 4 the sponge is compressed substantially uniformly from front to rear.

The right angled link 21 eliminates any stress immediately at the fabric 18. The right angle of the hinge link and the stop arrangement both combine to maintain the link when in position of Figure 4 from forcing the sponge rearwardly of the head 1 or its fabric 18 at this forward edge.

The curve formation of the wringer 20 accommodates the bulk-up of the sponge under the wringing action and the longitudinal rolling of the edges 35, not only provides for the hinge connection of the wringer to the link 21 but also serves to effectively strengthen the wringer construction.

A slot 36 formed in the wringer immediately beneath the outer or upper rolled edge 35 receives the spring tongue 37 of the cantilever spring 12 which is shaped to form a seat for the roller wringer edge as shown in Figure 2 to lock the wringer in upright retracted position.

The short length of the right angled hinge section 22 of the link seats snugly between the forward edge of the head and the front of the socket base 7 in an out-of-the way position to form a neat and compact mop construction.

Under the wringing action, as shown particularly in Figure 4, with pressure on the handles 11 and 33, it will be appreciated that high stresses may be set up on the connection between the socket and mop head under the application of appreciable force.

Thus the connection afforded by the welding or securing of the lugs 3 and 4 to the surfaces 9 and 10 receiving this stress in shear, in which the weld is essentially strong, enables the wringing to be carried out without destruction or detriment of the connection.

Additionally, since the socket base 5 presents a surface perpendicular to the mop head 1 at its line of contact, there will be no bending or detrimental stresses tending to turn or twist the socket.

Additionally, by securing the inward projections 9 of the socket to the lug extension 3, this lug closes the split socket construction forming it into an inherently strong structural member.

It will be appreciated that variations and modifications in the particular structural details may be varied without departing from the scope of the appended claims.

What I claim as my invention is:

1. In a cleaning device, a mop head having lug extensions struck up therefrom and integral therewith, a split socket of generally tubular shape and formed with an open sided substantially rectilinear base presenting at the open side thereof opposite edge portions of said socket in contiguous coplanar relation, said lug extensions forming a pattern to guide said socket into assembled relation with said head, with said socket base and extensions in abutting contact over an appreciable surface area and with one of said lug extensions in contact with said coplanar edge portions and bridged across the opening therebetween, and means rigidly securing said socket base to said extensions and fixing said base in rectilinear form.

2. In a cleaning device, a base plate having lug extensions struck up therefrom, a split socket having an upper handle gripping portion of substantial length and a base open at one side to define a slit between a pair of opposing coplanar edge portions, said base being in engagement with said extensions over an appreciable surface area with one of said extensions engaging said adjoining edge portions and closing said slit, means rigidly connecting said socket base to said extensions and forming said socket base into a rigid structural member, and means for closing the upper portion of said split socket on a handle.

3. In a cleaning device, a socket connection for securing a handle to a head comprising a socket of tabular form having a non-circular base having at one side a vertical slit defined between a pair of adjoining substantially coplanar edge portions, said base being adapted to seat on a head with the socket inclined at an acute angle thereto and having an upper handle gripping portion conformable to a handle independently of said base, and means for conforming said upper handle gripping portion to a handle, said head being formed with a formation of upstanding lugs integral therewith and defining guide projections engaging said socket base to seat same in accurately oriented position on said head with said lugs in contact with said socket base over an appreciable surface area, one of said lugs engaging said coplanar edge portions to close said slit and means rigidly securing said lugs to said base to form said base into a rigid structure.

4. In a sponge mop, a head in the form of an elongated plate, a longitudinal edge on said plate formed up intermediate its length to present an upwardly inclined lug extension, a lug formed up from said plate opposite said lug extension and extending substantially parallel thereto, a socket formed with a base open at one side to define a slit between a pair of opposing coplanar edge portions, said base being formed to present parallel surfaces abutting said lug extensions and being rigidly secured thereto with one of said lug extensions closing said slit and forming said base into a rigid structure having an upper handle gripping portion conformable to a handle independently of said base, means for conforming said upper handle gripping portion to a handle, a handle secured in said upper handle gripping socket portion, a sponge block secured to said head, and a wringer pivotally connected to said head and swingable in wringing action to compress said sponge against said head with a progressively increasing pressure, the connection between said socket and lug extensions being placed under a progressively increasing shear under wringing action and presenting an appreciable area resistant to shear.

5. In a sponge mop, a head in the form of an elongated plate having rolled longitudinal edges, one of said longitudinal edges forming the rear of said head in relation to direction of mop advance being formed up intermediate its length to present an upwardly inclined lug extension, a lug formed up from said plate opposite said lug extension, a split socket having a substantially open sided base abutting said lug extensions and being rigidly secured thereto with one of said lug extensions closing the open side of said split socket base and forming said base into a rigid structure having an upper handle gripping portion conformable to a handle independently of said base, means for conforming said upper handle gripping portion to a handle, a handle secured in said upper handle gripping portion, a sponge block releasably secured to said head, a hinge link pivoted to the other of said longitudinal edges, and a wringer plate hinged to said link, said link and wringer being swingable to bring said wringer into position to compress said sponge block against said head with a progressively increasing presure under wringing action while exerting a progressively increasing shear on the connection between said lugs and said socket.

6. In a cleaning device, a socket comprising a metal socket shaped to provide a tubular conformable upper handle gripping portion presenting opposite edge portions of the socket as a pair of parallel wings and to provide a lower base of generally rectilinear configuration presenting opposite edge portions of the base as contiguous coplanar portions defining a substantially open side of the base, said socket having aligned slots extending inwardly from opposite edges thereof separating said upper handle gripping portion and said base to enable said handle gripping portion to conform to a handle independently of its base, a mop head having lug extensions struck up therefrom forming a pattern to guide said socket into assembled relation with said head with said socket base and extensions in abutting contact over an appreciable surface area and with one of said lug extensions in contact with said coplanar edge portions and bridged across the opening therebetween, means rigidly securing said socket base to said extensions and fixing said base in rectilinear form, and means acting on said wings to conform said handle gripping socket portion to grip a handle.

7. A device as claimed in claim 2 in which said split socket is provided with slit means extending inwardly from the opposing edges of said socket in substantially aligned relation to separate said upper handle gripping portion from said base portion sufficiently to enable said handle gripping portion to conform to a handle throughout its entire length.

References Cited in the file of this patent

UNITED STATES PATENTS

| | | |
|---|---|---|
| 789,258 | Connolly | May 9, 1905 |
| 1,147,332 | McNeill et al. | July 20, 1915 |
| 1,785,564 | Schweigert | Dec. 16, 1930 |
| 1,795,249 | Carter | Mar. 3, 1931 |
| 2,201,079 | Camden | May 14, 1940 |
| 2,267,201 | Hirai | Dec. 23, 1941 |
| 2,504,694 | Jenkins | Apr. 18, 1950 |
| 2,515,403 | Greenleaf et al. | July 18, 1950 |

FOREIGN PATENTS

| | | |
|---|---|---|
| 396,469 | Great Britain | Aug. 10, 1933 |
| 642,045 | France | May 1, 1928 |